US011153205B2

(12) United States Patent
Hanley et al.

(10) Patent No.: US 11,153,205 B2
(45) Date of Patent: Oct. 19, 2021

(54) SYSTEMS AND METHODS FOR ESTABLISHING COMMUNICATION LINKS BETWEEN NETWORKS AND DEVICES WITH DIFFERENT ROUTING PROTOCOLS

(71) Applicant: Landis+Gyr Innovations, Inc., Alpharetta, GA (US)

(72) Inventors: James Patrick Hanley, Decatur, GA (US); Chad K. Wolter, Pequot Lakes, MN (US); Bryce D. Johnson, Loveland, CO (US); Lawrence Harris, Duluth, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 96 days.

(21) Appl. No.: 16/367,587

(22) Filed: Mar. 28, 2019

(65) Prior Publication Data
US 2020/0314005 A1    Oct. 1, 2020

(51) Int. Cl.
*H04W 72/04*      (2009.01)
*H04L 12/753*     (2013.01)
(Continued)

(52) U.S. Cl.
CPC .............. *H04L 45/48* (2013.01); *H04L 45/02* (2013.01); *H04L 45/16* (2013.01); *H04L 61/6059* (2013.01)

(58) Field of Classification Search
CPC ..... H04L 45/48; H04L 45/16; H04L 61/6059; H04L 45/02; H04L 2001/0093;
(Continued)

(56) References Cited

U.S. PATENT DOCUMENTS

2014/0126431 A1* 5/2014 Hui ................... H04L 69/324
370/277
2016/0043942 A1* 2/2016 Purohit ............... H04W 40/244
370/338
(Continued)

OTHER PUBLICATIONS

Ericsson et al., "When to Use RFC 6553, 6554 and IPv6-in-IPv6", ROLL Working Group, Internet-Draft, XP015124411, Jul. 18, 2016, pp. 1-30.
(Continued)

*Primary Examiner* — Awet Haile
(74) *Attorney, Agent, or Firm* — Kilpatrick Townsend & Stockton LLP (57) ABSTRACT

Aspects and examples are disclosed for apparatuses and processes for establishing a communication link between a network using a routing protocol for low power and lossy networks (RPL) and a non-RPL-enabled device. For instance, a communication link establishment method includes establishing, by a routing protocol for low power and lossy networks (RPL) enabled device, a communication link with a non-RPL-enabled device. The method also includes establishing, by the RPL-enabled device, a network connection with an RPL-enabled network. Further, the method includes providing, by the RPL-enabled device, a proxy communication link between the non-RPL-enabled device and the RPL-enabled network. Providing the proxy communication link includes assigning a globally unique address (GUA) to the non-RPL-enabled device, and transmitting, by the RPL-enabled device, a proxy destination advertisement object to the RPL-enabled network where the proxy destination advertisement object comprises the GUA.

20 Claims, 6 Drawing Sheets

(51) Int. Cl.
*H04L 12/751* (2013.01)
*H04L 12/761* (2013.01)
*H04L 29/12* (2006.01)

(58) Field of Classification Search
CPC ..... H04L 41/12; H04L 12/18; H04L 12/2836; H04L 2001/0097; H04L 41/085; H04L 45/70; H04L 45/44; H04L 45/54; Y02D 30/00; Y02D 30/70; H04W 40/246
See application file for complete search history.

(56) References Cited

U.S. PATENT DOCUMENTS

2017/0187831 A1* 6/2017 Otting ............... H04W 12/0401
2019/0004587 A1* 1/2019 Van Wyk ............. H04W 40/20

OTHER PUBLICATIONS

International Patent Application No. PCT/US2020/022949, International Search Report and Written Opinion, dated May 29, 2020, 16 pages.
Thubert et al., "An Architecture for IPv6 Over the TSCH Mode of IEEE 802.15.4", 6TiSCH, Internet-Draft, available online at: https://tools.ietf.org/html/draft-ietf-6tisch-architecture-19, Dec. 17, 2018, 60 pages.
Thubert et al., "Routing for RPL Leaves", ROLL, Internet-Draft, available online at: https://tools.ietf.org/html/draft-thubert-roll-unaware-leaves-06, Nov. 19, 2018, 19 pages.
Winter et al., "RPL: IPv6 Routing Protocol for Low-Power and Lossy Networks", Internet Engineering Task Force (IETF), Mar. 2012, 157 pages.

\* cited by examiner

SYSTEMS AND METHODS FOR ESTABLISHING COMMUNICATION LINKS BETWEEN NETWORKS AND DEVICES WITH DIFFERENT ROUTING PROTOCOLS

TECHNICAL FIELD

This disclosure relates generally to processes for establishing communication links between networks and devices with different routing protocols. More particularly this disclosure relates to establishing a communication link between a network using a routing protocol for low power and lossy networks (RPL) and a non-RPL-enabled device.

BACKGROUND

Networked systems, such as networks of smart power, gas, and water meters and other smart devices (i.e., devices capable of connecting to and communicating with other devices or networks), are capable of interconnecting with each other for interdevice communication in a mesh network. Further, a group of the smart devices within the mesh network may communicate with other smart devices across the mesh network using code defining a routing protocol for low power and lossy networks (RPL).

For example, a mesh network of low power or lossy smart devices may rely on RPL-enablement to effectively communicate with other RPL-enabled smart devices forming the mesh network. In general, RPL protocol provides a mechanism to build routes between nodes (e.g., the smart devices) of the mesh network and to distribute routing knowledge among the nodes of the mesh network. Further, the RPL protocol implements processes that reduce overall energy consumption of the nodes and addresses topology inconsistencies among the nodes.

Certain issues arise with mesh networks of RPL-enabled smart devices. For example, smart devices or other nodes that are not RPL-enabled may not be capable of communicating with or otherwise accessing the mesh network of RPL-enabled smart devices. Adding RPL code to a non-RPL smart device may overcome this limitation, but the addition of the RPL code to every non-RPL smart device seeking a communication link to the mesh network may not be practical. Thus, communication between the non-RPL-enabled smart devices and the mesh network of RPL-enabled smart devices may be unavailable.

SUMMARY

Aspects and examples are disclosed for apparatuses and processes for establishing a communication link between a network using a routing protocol for low power and lossy networks (RPL) and a non-RPL-enabled device. For instance, a communication link establishment method includes establishing, by a routing protocol for low power and lossy networks (RPL) enabled device, a communication link with a non-RPL-enabled device. The method also includes establishing, by the RPL-enabled device, a network connection with an RPL-enabled network. Further, the method includes providing, by the RPL-enabled device, a proxy communication link between the non-RPL-enabled device and the RPL-enabled network. Providing the proxy communication link includes assigning a globally unique address (GUA) to the non-RPL-enabled device, and transmitting, by the RPL-enabled device, a proxy destination advertisement object to the RPL-enabled network where the proxy destination advertisement object comprises the GUA.

In another example, a node of a networked system includes a processor that executes computer-readable instructions. The node also includes a memory that stores the computer-readable instructions that, when executed by the processor, cause the processor to perform operations. The operations performed by the processor include establishing a network connection between the node and a protocol-enabled network. The operations also include establishing a communication link between the node and a non-protocol-enabled device. Further, the operations include providing a proxy communication link between the non-protocol-enabled device and the protocol-enabled network through the node.

In another example, a non-transitory computer-readable medium has instructions stored thereon. The instructions are executable by a processing device to perform operations. The operations executable by the processing device include establishing a communication link between a routing protocol for low power and lossy networks (RPL) enabled device and a non-RPL-enabled device. The operations also include establishing a network connection between the RPL-enabled device and an RPL-enabled network. Further, the operations include providing a proxy communication link between the non-RPL-enabled device and the RPL-enabled network using the RPL-enabled device.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for establishing a communication link between a network using a routing protocol for low power and lossy networks (RPL) and a non-RPL-enabled device. Within the network, a node may be any device accessing the network that is capable of transmitting data to and receiving data from other nodes or a centralized network (e.g., the internet or an intranet). In some networks (e.g., a low power and lossy network (LLN)), the nodes may communicate with each other and the centralized network using the RPL protocol. To provide access to the RPL-enabled networks by nodes that are not RPL-enabled (e.g., nodes that do not include programming code defining the RPL protocol), the non-RPL-enabled nodes may establish communication links with RPL-enabled nodes. The communication links between the non-RPL-enabled nodes and the RPL-enabled nodes may provide the ability for the non-RPL-enabled nodes to communicate with the RPL-enabled networks using the RPL-enabled nodes to route traffic between the non-RPL-enabled nodes and the RPL-enabled networks.

In operation, the non-RPL-enabled node and the RPL-enabled node may establish a point-to-point protocol (PPP) communication link. Additionally, the RPL-enabled node may join a RPL-enabled network. Upon establishing the PPP communication link and joining the RPL-enabled network, the RPL-enabled node may function as a proxy to establish a communication link between the non-RPL-enabled node and the RPL-enabled network to route IPv6 data packets between the non-RPL-enabled node and the RPL-enabled network.

Figure 1:
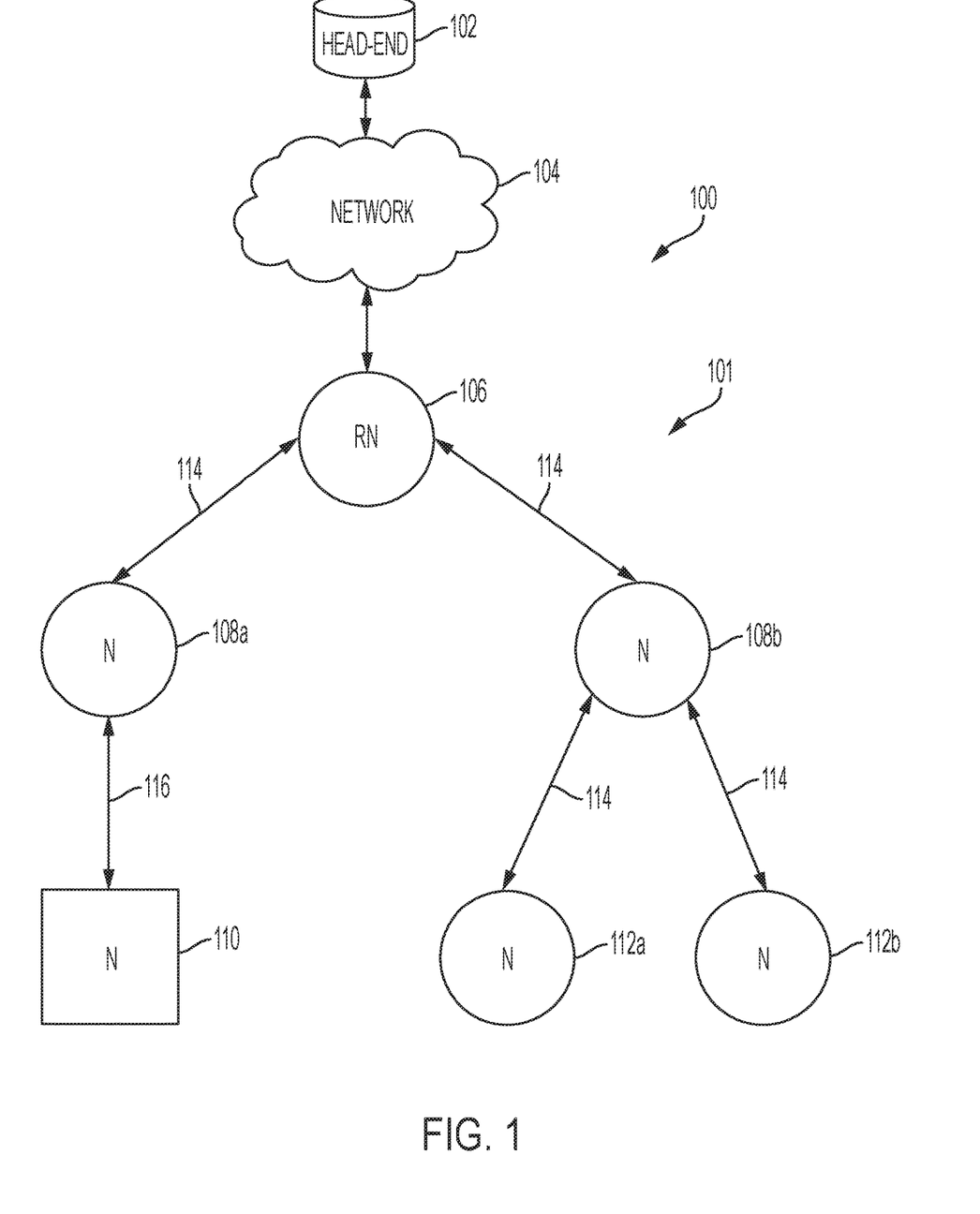
FIG. 1 is a block diagram illustrating an example of a networked system and a mesh network of smart devices, in accordance with one or more examples.

FIG. 1 is a block diagram illustrating an example of a networked system 100 and a mesh network 101 of smart devices. The networked system 100 and the mesh network 101 provide a network infrastructure for smart devices (e.g., resource consumption meters, vehicles, home appliances, etc. that include communication technology) to communicate across a network of nodes (i.e., other smart devices), the internet, and/or an intranet. The networked system 100 includes a head-end 102, which may function as a central processing system that receives a stream of data from a network 104. The network 104 may be the internet, an intranet, or any other data communication network. The mesh network 101 may include a root node 106 that provides a communication path between the network 104 and other nodes 108a and 108b. For example, the root node 106 may collect data from the nodes 108a and 108b and transmit the collected data to the network 104 and ultimately to the head-end 102 of the networked system 100. The root node 106 may be a personal area network (PAN) coordinator, an internet gateway, or any other device capable of connecting to the network 104. Further, node 110 may communicate with the root node 106 by way of the node 108a, and nodes 112a and 112b may communicate with the root node 106 by way of the node 108b.

The root node 106 may generally be referred to as a parent node due to data links with the nodes 108a and 108b that are located at a node layer (e.g., layer one) below the root node 106. For example, the root node 106 is illustrated as communicating directly with the network 104. As illustrated, nodes 108a and 108b may also be referred to as parent nodes due to data links with node 110 and nodes 112a and 112b, respectively, which are located at a node layer (e.g., layer two) below the nodes 108a and 108b. The nodes 108a, 108b, 110, 112a, and 112b may all funnel information up through the node layers to the root node 106, to the network 104, and ultimately to the head-end 102.

Each of the nodes 106, 108a, 108b, 110, 112a, and 112b are linked with at least one of the other nodes 106, 108a, 108b, 110, 112a, and 112b. In an example, the nodes 106, 108a, 108b, 112a, and 112b may all be nodes that are routing protocol for low power and lossy networks (RPL) enabled. That is, the nodes 106, 108a, 108b, 112a, and 112b may each include code the enables communication using a RPL protocol across a RPL-enabled field-area network (FAN) (e.g., the mesh network 101). Links 114 may be created between the RPL-enabled nodes 106, 108a, 108b, 112a, and 112b to enable communication between the RPL-enabled nodes 106, 108a, 108b, 112a, and 112b.

The node 110 may not be a RPL-enabled node. That is, the node 110 may not include code that enables communication with the RPL-enabled FAN. That is, the node 110 may not include RPL routing capability. Accordingly, the node 110 and the RPL-enabled node 108a may create a link 116 that enables the node 108a to operate as a proxy for the node 110 to establish a communication link from the node 110 to the RPL-enabled root node 106, the network 104, or both. In this manner, the node 110, which is not enabled for communication with the RPL-enabled FAN, is able to communicate with the RPL-enabled FAN and other RPL-enabled nodes 106, 108a, 108b, 112a, and 112b that are also in communication with the RPL-enabled FAN.

While the nodes 106, 108a, 108b, 112a, and 112b are described above and below as being RPL-enabled, networks of nodes operating with other communication protocols may communicate with non-protocol enabled nodes in a similar manner to the RPL protocol described in the present disclosure. For example, the nodes 106, 108a, 108b, 112a, and 112b may be border-gateway protocol (BGP) enabled. Other routing protocols are also contemplated within the scope of the present disclosure, such as a 6LoWPAN Ad Hoc On-Demand Distance Vector Routing (LOAD) protocol.

In operation, fewer or more nodes may be included in the mesh network 101, and more root nodes 106 may also be included in the networked system 100. Additionally, while the mesh network 101 depicted in FIG. 1 includes a root node layer (i.e., the root node 106), layer one (i.e., the nodes 108a and 108b), and layer two (i.e., the nodes 110, 112a, and 112b), fewer or more node layers are also contemplated. Further, multiple non-RPL-enabled nodes 110 may be communicatively coupled to the same RPL-enabled node 108a, and additional non-RPL-enabled nodes 110 may be communicatively coupled to other RPL-enabled nodes 108b, 112a, and 112b. Moreover, while FIG. 1 depicts a specific network topology (e.g., a DODAG tree topology), other network topologies are also possible (e.g., a ring topology, a mesh topology, a star topology, etc.).

Figure 2:
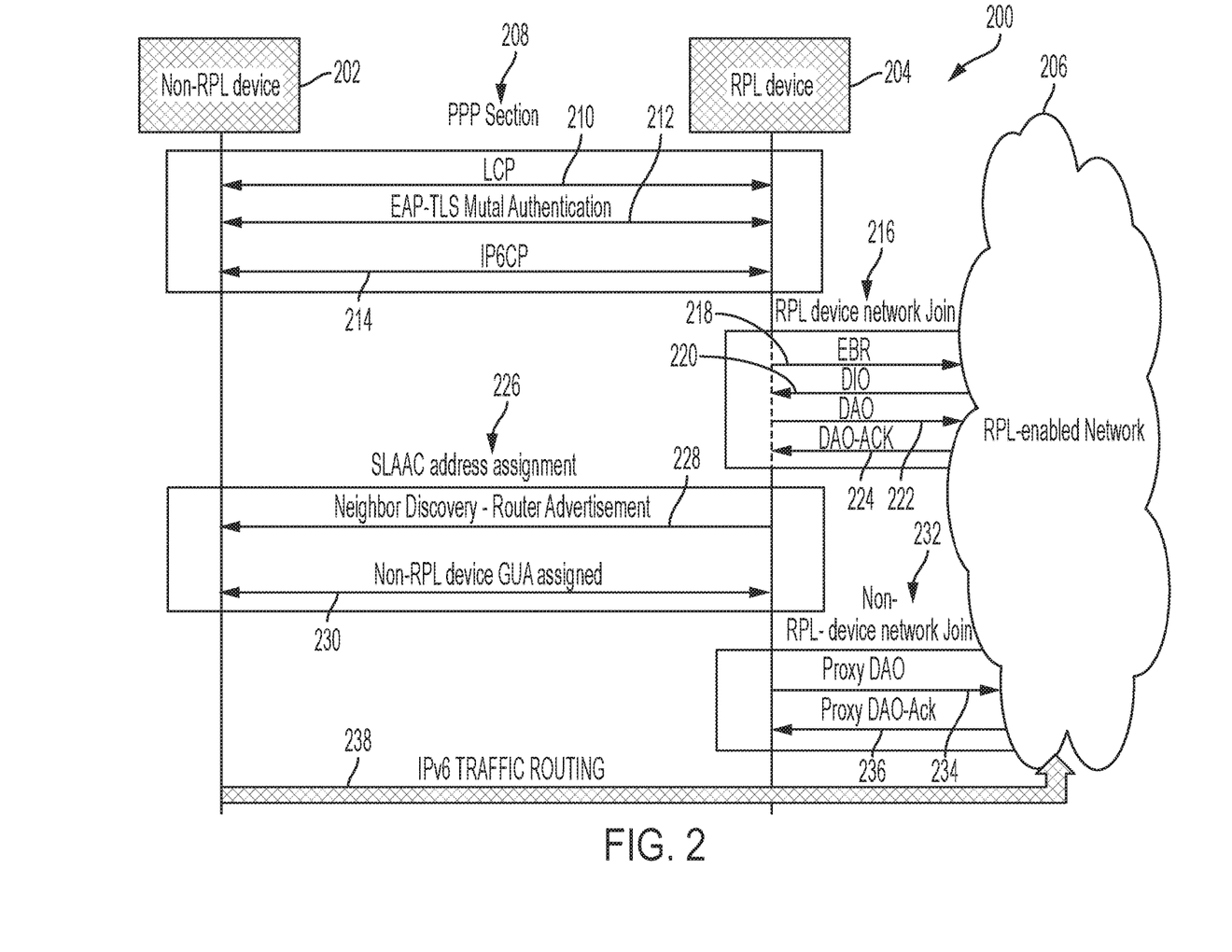
FIG. 2 is a block diagram illustrating an example of a communication scheme for linking a device with the networked system of FIG. 1, in accordance with one or more examples.

FIG. 2 is a block diagram illustrating an example of a communication scheme 200 for linking a device (e.g., the node 110) with the networked system 100. The communication scheme 200 depicts interactions that result in communicatively coupling a non-RPL-enabled device 202 (e.g., the node 110) with a RPL-enabled device 204 (e.g., the node 108a). Further, the communication scheme 200 depicts interactions that result in communicatively coupling the RPL-enabled device 204 to a RPL-enabled network 206 (e.g., the root node 106 or the network 104). The communication scheme 200 also depicts interactions that result in communicative coupling between the non-RPL-enabled device 202 and the RPL-enabled network 206 through the RPL-enabled device 204 operating as a proxy to send a proxy DAO message to the RPL-enabled network 206 that establishes the non-RPL-enabled device 202 as part of a message routing tree.

At block 208, the communication scheme 200 depicts creation of a point-to-point protocol (PPP) session between the non-RPL-enabled device 202 and the RPL-enabled device 204. While the PPP session is depicted at block 208, other communication protocols may also provide the capability to communicatively couple the non-RPL-enabled device 202 with the RPL-enabled device 204. For example, both the non-RPL-enabled device 202 and the RPL-enabled device 204 may have a proprietary communication protocol installed on both of the devices 202 and 204 that creates a connection with similar communication functionality as the PPP session. Further, the PPP session, or other suitable communication protocol session, may be initiated at power-up of the non-RPL-enabled device 202, power-up of the RPL-enabled device 204, or both, or the PPP session may be initiated at will by either the non-RPL-enabled device 202 or the RPL-enabled device 204.

To create the PPP session between the non-RPL-enabled device 202 and the RPL-enabled device 204, a link control protocol (LCP) process 210 establishes the session. For example, both the non-RPL-enabled device 202 and the RPL-enabled device 204 send each other LCP packets to determine standards of future data transmissions under the PPP session between the non-RPL-enabled device 202 and the RPL-enabled device 204. The LCP may determine an acceptability of the link (e.g., the link 116) between the devices 202 and 204 based on the exchanged LCP packets. The LCP process 210 may be initiated when the PPP session is initiated. For example, the LCP process 210 may begin at power-up of the non-RPL-enabled device 202, power-up of the RPL-enabled device 204, or both, or the PPP session may be initiated at will by either the non-RPL-enabled device 202 or the RPL-enabled device 204.

After the acceptability of the link between the devices 202 and 204 is established, an extensible authentication protocol-transport layer security (EAP-TLS) mutual authentication process 212 may assure mutual authentication between the non-RPL-enabled device 202 and the RPL-device 204. The EAP-TLS mutual authentication process 212 may evaluate that the non-RPL-enabled device 202 and the RPL-enabled device 204 are authentic. The EAP may be a 4-way handshake that enables the non-RPL-enabled device 202 and the RPL-enabled device 204 to independently authenticate one another. The TLS is the type of authentication used by the non-RPL-enabled device 202 and the RPL-enabled device 204.

The EAP-TLS mutual authentication process 212 may be an optional step in the creation of the PPP session at block 208. For example, some devices 202 and 204 may not be enabled with EAP-TLS software. In other examples, the EAP-TLS mutual authentication process 212 may be replaced by another authentication process between the devices 202 and 204.

After completion of the LCP process 210, or the EAP-TLS mutual authentication process 212, an Internet Protocol version 6 Control Protocol (IP6CP) exchange 214 occurs between the non-RPL-enabled device 202 and the RPL-enabled device 204. With the IP6CP exchange 214, the RPL-enabled device 204 becomes aware of an interface identifier (i.e., a lower 64 bits of an IPv6 address) of the non-RPL-enabled device 202. In this manner, the IP6CP exchange 214 establishes IPv6 communication over the PPP session between the non-RPL-enabled device 202 and the RPL-enabled device 204.

At block 216, the communication scheme 200 depicts creation of a link (e.g., the link 114) between the RPL-enabled device 204 and the RPL-enabled network 206. While block 216 is depicted as occurring after block 208, the link between the RPL-enabled device 204 and the RPL-enabled network 206 may also be created in parallel with creation of the PPP session at block 208, or the link between the RPL-enabled device 204 and the RPL-enabled network 206 may be created prior to creation of the PPP session 208.

Initially, the RPL-enabled device 204 transmits an enhanced beacon request (EBR) 218 to the RPL-enabled network 206. The EBR 218 may provide an indication to the RPL-enabled network 206 that the RPL-enabled device 204 would like to establish a link with the RPL-enabled network 206. In an example, the EBR 218 may be received by the root node 106 in communication with the RPL-enabled network 206.

After receiving the EBR 218, the RPL-enabled network 206, through, for example, the root node 106, may provide a destination oriented directed acyclic graph (DODAG) information object (DIO) 220 to the RPL-enabled device 204. The DIO 220 may provide a network prefix of the RPL-enabled network 206 to the RPL-enabled device 204. In an example, the DIO 220 carries information that enables a node receiving the DIO 220 to learn of a potential RPL connection, learn configuration parameters of the RPL connection, select a DODAG parent set, and maintain the DODAG path.

Upon receipt of the DIO 220, the RPL-enabled device 204 may transmit a destination advertisement object (DAO) 222 to the RPL-enabled network 206 through, for example, the root node 106. The DAO 222 may be used to propagate destination information upward along the DODAG. The root node 106 in communication with the RPL-enabled network 206 may provide the RPL-enabled device 204 with a DAO acknowledgement 224, which acknowledges that the DAO 222 was received by the RPL-enabled network 206.

Because the RPL-enabled device 204 is in possession of the interface identifier of the non-RPL-enabled device 202 (e.g., provided by the IP6CP exchange 214) and the network prefix of the RPL-enabled network 206, the RPL-enabled device 204 may concatenate the network prefix with the interface identifier to generate a globally unique address (GUA) of the non-RPL-enabled device 202. The GUA of the non-RPL-enabled device 202 generated by the RPL-enabled device 204 may be added to an IP routing table of the RPL-enabled device 204 such that the RPL-enabled device 204 is able to route information from the RPL-enabled network 206 to the non-RPL-enabled device 202. In another example, a unique local address may be generated in place of the GUA.

At block 226, the communication scheme 200 depicts a stateless address autoconfiguration (SLAAC) address assignment from the RPL-enabled device 204 to the non-RPL-enabled device 202. Initially, the RPL-enabled device 204 provides a neighbor discovery protocol router advertisement 228 to the non-RPL-enabled device 202. The neighbor discovery protocol router advertisement 228 includes the network prefix originally received by the RPL-enabled device 204 from the DIO 220. The neighbor discovery protocol router advertisement 228 may also be generated by the RPL-enabled device 204 using a secure neighbor discovery (SEND) protocol. The SEND protocol may use cryptographically generated addresses for packet types used in the neighbor discovery protocol.

Using the network prefix, the non-RPL-enabled device 202 may generate its own globally unique address (GUA). The GUA for the non-RPL-enabled device 202 may include a combination of the network prefix, an organizationally unique identifier (e.g., a specific hardware vendor) of the non-RPL-enabled device 202, and an interface identifier of the non-RPL-enabled device 202 (e.g., the interface identifier provided to the RPL-enabled device 204 by the IP6CP exchange 214) that uniquely identifies the non-RPL-enabled device 202. The GUA may be used by the RPL-enabled device 204 to identify that a message to the RPL-enabled network 206 originates from the non-RPL-enabled device 202. In another example, instead of the non-RPL-enabled device 202 generating the GUA, the RPL-enabled device 204 may unilaterally assign a GUA to communications routed through the RPL-enabled device 204 from the non-RPL-enabled device 202. In such an example, the non-RPL-enabled device 202 may not be aware of the GUA assigned to communications transmitted from the non-RPL-enabled device 202.

At block 232, the non-RPL-enabled device 202 is able to join the RPL-enabled network 206 using the RPL-enabled device 204 as a proxy for transmitting a proxy DAO 234 to the RPL-enabled network 206. For example, the RPL-enabled device 204 generates the proxy DAO 234 for the non-RPL-enabled device 202 with the GUA of the non-RPL-enabled device 202 and an indication (e.g., a flag) that the GUA originates from an external device. The RPL-enabled network 206 may send a proxy DAO acknowledgement 236 acknowledging that the proxy DAO 234 was received by the RPL-enabled network 206. In an example, the root node 106 receives the proxy DAO 234 from the RPL-enabled device 204 and provides the proxy DAO acknowledgement 236 to the RPL-enabled device 204. Providing the proxy DAO 234 to the RPL-enabled network 206 may add the non-RPL-enabled device 202 to the routing tree. Adding the non-RPL-enabled device 202 to the routing tree provides the ability for the RPL-enabled network 206 to route messages directly to the non-RPL-enabled device 202 through the RPL-enabled device 204.

Upon joining the RPL-enabled network 206 using the RPL-enabled device 204, the non-RPL-enabled device 202 is able to rely on IPv6 traffic routing 238 to route IPv6 communications through the RPL-enabled device 204 to the RPL-enabled network 206. In this manner, the non-RPL-enabled device 202 may communicate with the RPL-enabled network 206 without installation of RPL enabling code on the non-RPL-enabled device 202. As discussed above, a border gateway protocol (BGP) communication scheme may also be implemented in a similar manner as the RPL communication scheme 200 described above.

While the non-RPL-enabled device 202 is described above as an individual device, the non-RPL-enabled device 202 may also be a series of devices. For example, the non-RPL-enabled device 202 may be a device with multiple physical data ports in communication with several different data producing devices. Additionally, multiple proxy DAOs may be communicated to the RPL-enabled network 206 from the RPL-enabled device 204 to represent each of the multiple non-RPL-enabled devices 202 communicating with the RPL-enabled network 206 through the RPL-enabled device 204. In another example, the non-RPL-enabled device 202 may be in communication with multiple data producing devices, but the RPL-enabled device 204 may communicate only the individual proxy DAO 234 to the RPL-enabled network 206 for the non-RPL-enabled device 202.

Figure 3:
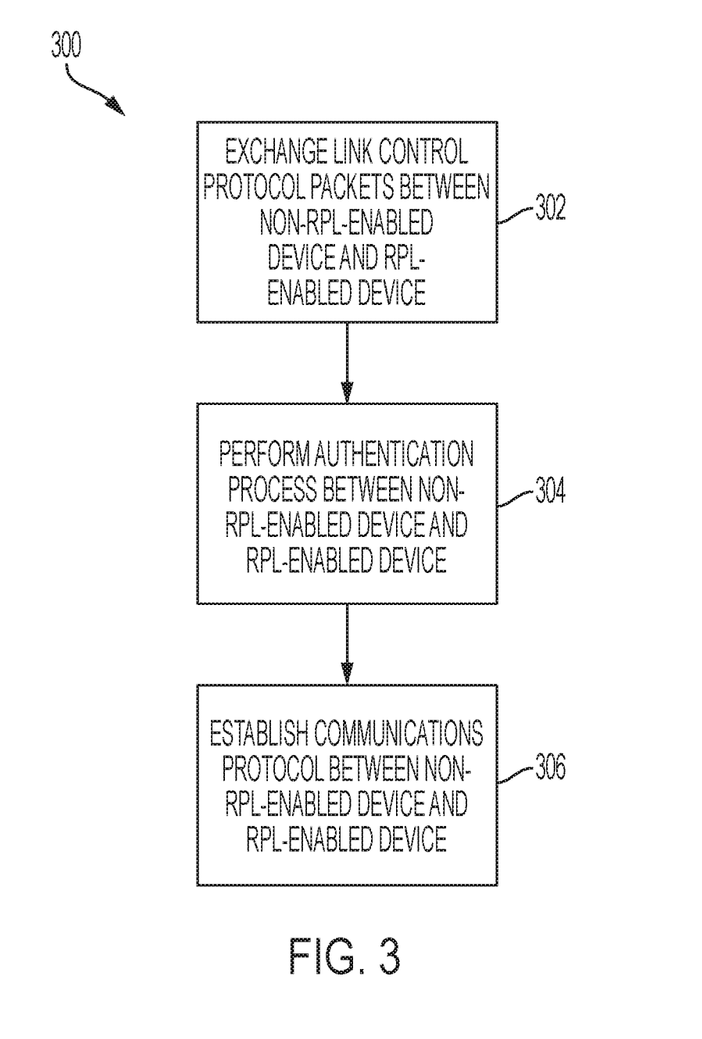
FIG. 3 is an example of a process for generating a point-to-point protocol (PPP) connection between a routing protocol for low power and lossy networks (RPL) enabled device and a non-RPL-enabled device, in accordance with one or more examples.

FIG. 3 is an example of a process 300 for generating a point-to-point protocol (PPP) connection between the RPL-enabled device 204 and the non-RPL-enabled device 202. At block 302, the process 300 involves exchanging link control protocol (LCP) packets between the RPL-enabled device 204 and the non-RPL-enabled device 202. The exchange of LCP packets may determine standards of future data transmissions under the PPP connection between the RPL-enabled device 204 and the non-RPL-enabled device 202. For example, the LCP packet exchange may determine an acceptability of the link (e.g., the link 116) between the devices 202 and 204.

At block 304, the process 300 involves performing an authentication process between the non-RPL-enabled device 202 and the RPL-enabled device 204. The authentication process may be the EAP-TLS mutual authentication process 212, or the authentication process may be any other suitable authentication process that is capable of mutual authentication between the non-RPL-enabled device 202 and the RPL-enabled device 204. The EAP-TLS mutual authentication process 212, for example, may provide a mechanism for the non-RPL-enabled device 202 and the RPL-enabled device 204 to evaluate whether each of the devices 202 and 204 are authentic. The EAP may be a 4-way handshake that enables the non-RPL-enabled device 202 and the RPL-enabled device 204 to independently authenticate one another. The TLS is the particular type of authentication used by the non-RPL-enabled device 202 and the RPL-enabled device 204.

The EAP-TLS mutual authentication process 212, or any other suitable authentication process, may be an optional step in the process 300. For example, some devices 202 and 204 may not be enabled with EAP-TLS software or software capable of performing the same authentication process across the two devices 202 and 204. In such an instance, the process 300 may proceed absent an authentication process.

At block 306, the process 300 involves establishing a routing protocol between the non-RPL-enabled device 202 and the RPL-enabled device 204. After determining that the link between the devices 202 and 204 is acceptable, and optionally after mutually authenticating the two devices 202 and 204, the communication protocol may be established between the devices 202 and 204. In an example, the IP6CP exchange 214 occurs between the non-RPL-enabled device 202 and the RPL-enabled device 204. With the IP6CP exchange 214, the RPL-enabled device 204 becomes aware of an interface identifier (i.e., a lower 64 bits of an IPv6 address) of the non-RPL-enabled device 202. In this manner, the IP6CP exchange 214 establishes IPv6 communication over the PPP session between the non-RPL-enabled device 202 and the RPL-enabled device 204.

Figure 4:
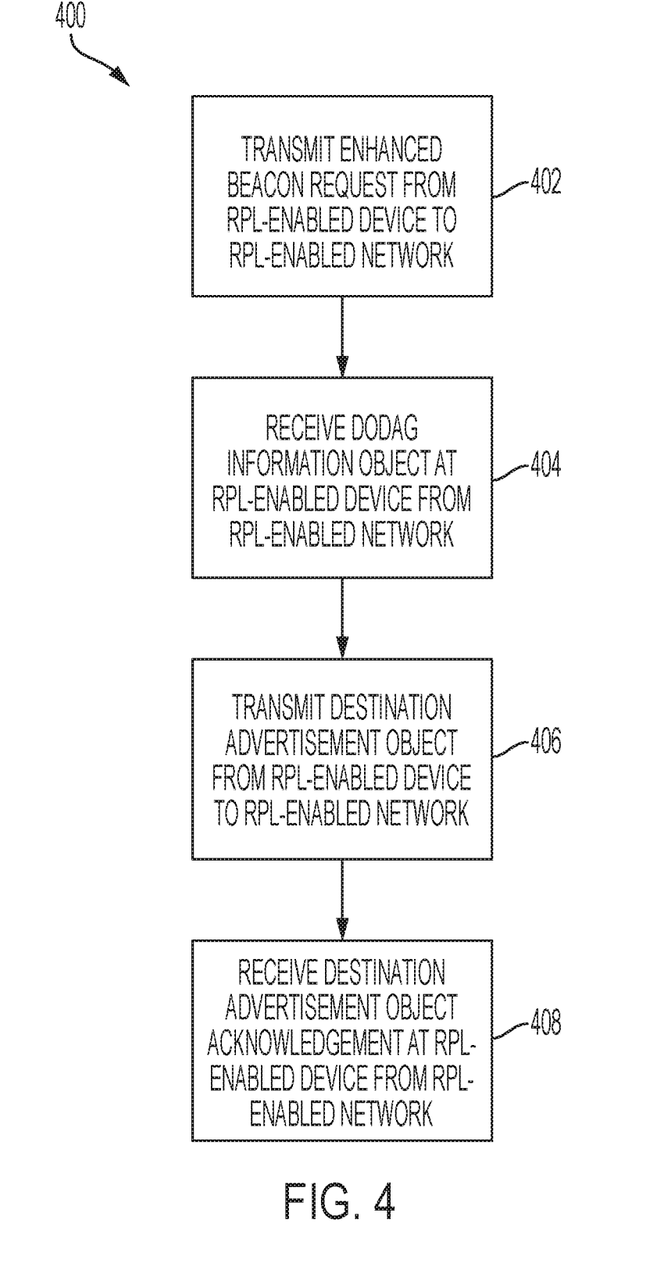
FIG. 4 is an example of a process for a RPL-enabled device to join a RPL-enabled network, in accordance with one or more examples.

FIG. 4 is an example of a process 400 for the RPL-enabled device 204 to join the RPL-enabled network 206. In one or more examples, the process 400 may occur before, during, or after the process 300 described above. At block 402, the process 400 involves transmitting the EBR 218 from the RPL-enabled device 204 to the RPL-enabled network 206. The EBR 218 may provide an indication to the RPL-enabled network 206 that the RPL-enabled device 204 would like to establish a link and join the RPL-enabled network 206. In an example, the EBR 218 may be received by the root node 106 in communication with the RPL-enabled network 206.

At block 404, the process 400 involves receiving the DIO 220 at the RPL-enabled device 204 from the RPL-enabled network 206. The DIO 220 may provide a network prefix of the RPL-enabled network 206 to the RPL-enabled device 204. Further, the DIO 220 may be sent to the RPL-enabled network 206 by the root node 106. In an example, the DIO 220 carries information that enables a node receiving the DIO 220 to learn of a potential RPL connection, learn configuration parameters of the RPL connection, select a DODAG parent set, and maintain the DODAG path. Further, upon receipt of the network prefix from the DIO 220, the RPL-enabled device 204 may establish its own GUA.

At block 406, the process 400 involves transmitting the DAO 222 from the RPL-enabled device 204 to the RPL-enabled network 206. The DAO 222 may be used to propagate destination information upward along the DODAG. Further, at block 408, the process 400 may involve receiving the DAO acknowledgement 224 at the RPL-enabled device 204 from the RPL-enabled network 206. The DAO acknowledgement 224 may acknowledge that the DAO 222 was received by the RPL-enabled network 206. Upon receipt of the DAO acknowledgement 224, the RPL-enabled device 204 may be assured that a communication link with the RPL-enabled network 206 has been established.

While the process 400 describes joining the RPL-enabled device 204 with the RPL-enabled network 206 using the RPL protocol, other joining processes may be used when different routing protocols are used. For example, when a Wi-SUN protocol is used, the EBR 218 may be replaced by a PAN advertisement solicitation. Other routing protocols and joining processes may also be used.

Figure 5:
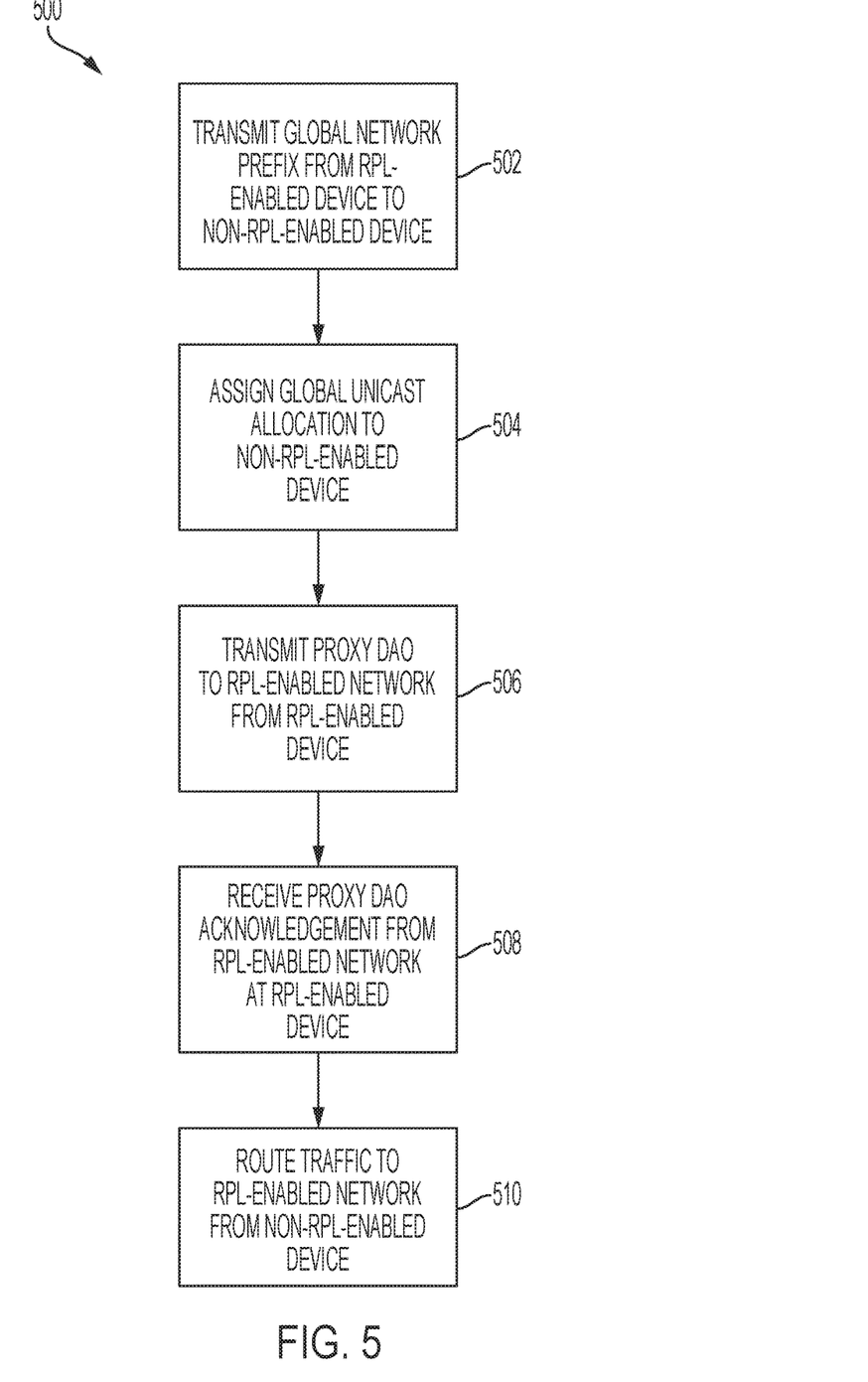
FIG. 5 is an example of a process for a non-RPL-enabled device to join a RPL-enabled network using a RPL-enable device, in accordance with one or more examples.

FIG. 5 is an example of a process 500 for the non-RPL-enabled device 202 to join the RPL-enabled network 206 using the RPL-enable device 204. At block 502, the process 500 involves transmitting a global network prefix from the RPL-enabled device 204 to the non-RPL-enabled device 202. The global network prefix, which may be the global network prefix of the RPL-enabled network 206, may be received by the RPL-enabled device 204 in the DIO 220. Upon receipt of the global network prefix, the RPL-enabled device 204 may provide the global network prefix to the non-RPL-enabled device 202 through the neighbor discovery protocol router advertisement 228. In an example, the global network prefix is provided in the neighbor discovery protocol router advertisement 228 as a portion of a globally unique address (GUA) of the RPL-enabled device 204. The neighbor discovery protocol router advertisement 228 may also be generated by the RPL-enabled device 204 using a secure neighbor discovery (SEND) protocol. The SEND protocol may use cryptographically generated addresses for packet types used in the neighbor discovery protocol.

At block 504, the process 500 involves assigning a GUA to the non-RPL-enabled device 202. In an example, the non-RPL-enabled device 202 may generate its own GUA using the global network prefix. The GUA for the non-RPL-enabled device 202 may include a combination of the global network prefix, an organizationally unique identifier (e.g., an identifier associated with a specific hardware vendor) of the non-RPL-enabled device 202, and an interface identifier of the non-RPL-enabled device 202 that uniquely identifies the non-RPL-enabled device 202 (e.g., the interface identifier provided to the RPL-enabled device 204 by the IP6CP exchange 214). The GUA may be used by the RPL-enabled device 204 to indicate that a message provided to the RPL-enabled network 206 from the RPL-enabled device 204 originates from the non-RPL-enabled device 202. In another example, the RPL-enabled device 204 may unilaterally assign a GUA to all communications routed through the RPL-enabled device 204 to the RPL-enabled network 206 from the non-RPL-enabled device 202.

At block 506, the process 500 involves transmitting the proxy DAO 234 from the RPL-enabled device 204 to the RPL-enabled network 206. The non-RPL-enabled device 202 is able to join the RPL-enabled network 206 using the RPL-enabled device 204 as a proxy to send the proxy DAO 234 to the RPL-enabled network 206. For example, the RPL-enabled device 204 generates the proxy DAO 234 for the non-RPL-enabled device 202 including the GUA of the non-RPL-enabled device 202 and an indication (e.g., a flag) that the GUA originates from an external device.

At block 508, the process 500 involves receiving the proxy DAO acknowledgement 236 at the RPL-enabled device 204 from the RPL-enabled network 206. The proxy DAO acknowledgement 236 acknowledges that the proxy DAO 234 was received by the RPL-enabled network 206. In an example, the root node 106 receives the proxy DAO 234 from the RPL-enabled device 204 at block 506 and provides the proxy DAO acknowledgement 236 to the RPL-enabled device 204 at block 508.

At block 510, the process 500 involves routing traffic to the RPL-enabled network 206 from the non-RPL-enabled device 202. For example, upon joining the RPL-enabled network 206 using the RPL-enabled device 204 as a proxy for transmitting the proxy DAO 234, the non-RPL-enabled device 202 is able to rely on the IPv6 traffic routing 238 to route IPv6 communications through the RPL-enabled device 204 to the RPL-enabled network 206. In this manner, the non-RPL-enabled device 202 may communicate with the RPL-enabled network 206 without relying on installation of RPL enabling code on the non-RPL-enabled device 202. Similarly, traffic from the RPL-enabled network 206 to the non-RPL-enabled device 202 may be routed directly to the non-RPL-enabled device 202 through the RPL-enabled device 204. In this manner, the RPL-enabled device 204 may receive traffic with an indication that the traffic should be routed to the non-RPL-enabled device 202, and the RPL-enabled device 204 may route the traffic to the non-RPL-enabled device 202 accordingly. As discussed above, a border gateway protocol (BGP) communication scheme or a LOAD communication scheme may also be implemented in a similar manner as the RPL communication scheme in the processes 300, 400, and 500.

Figure 6:
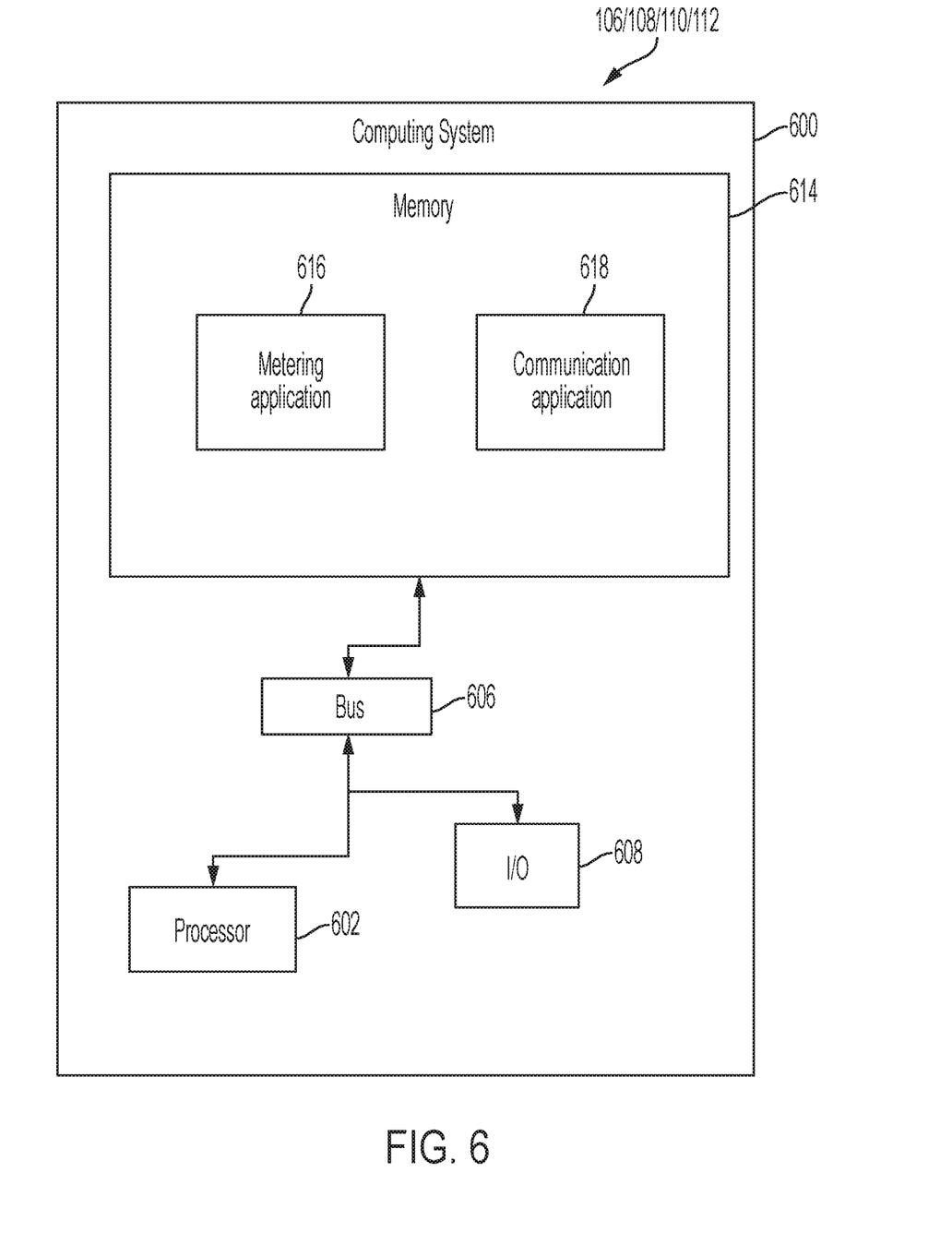
FIG. 6 is an example of a block diagram of components of a node of the mesh network of FIG. 1, in accordance with one or more examples.

FIG. 6 is an example of a block diagram of components of a node 106, 108, 110, or 112 of the mesh network 101. Some or all of the components of a computing system 600 can belong to one or more of the nodes 106, 108, 110, and 112 of FIG. 1. The computing system 600 includes one or more processors 602 communicatively coupled to one or more memory devices 614. The computing system 600 executes program code that configures the processor 602 to perform one or more of the operations described above with respect to FIGS. 1-5. For example, the memory devices 614 may include a metering application 616 (e.g., when the node 106, 108, 110, or 112 is a metering device) and a communication application 618. The program code of the metering application 616 and the communication application 618, which can be in the form of non-transitory computer-executable instructions, can be resident in the memory device 614 or any suitable computer-readable medium and can be executed by the processor 602. Execution of such program code configures or causes the processor(s) to perform the operations described herein with respect to the nodes 106, 108, 110, and 112. While FIG. 6 depicts the metering application 616 stored within the memory devices 614, other applications associated with other actions of the nodes 106, 108, 110, and 112 may replace the metering application 616 or be added to the metering application 616 depending on the functionality of the nodes 106, 108, 110, and 112. Further, the communication application 618 may provide instructions for the nodes 106, 108, 110, and 112 to implement multiple communication standards including the RPL routing protocol, the PPP protocol, an RF mesh, or any other wired or wireless communication standards.

In an example, a non-RPL-enabled node 110 and a RPL-enabled node 106, 108, or 112 may share a similar hardware structure, as indicated by the computing system 600. The communication application 618 of the RPL-enabled node 106, 108, or 112 includes programming code defining the RPL protocol described above. In contrast, the communication application 618 of the non-RPL-enabled node 110 lacks the programming code defining the RPL protocol. Accordingly, the communication application 618 of the non-RPL-enabled node 110 may rely on the communication application 618 of the RPL-enabled node 106, 108, or 112 to provide the RPL protocol needed for data routing between the non-RPL-enabled node 110 and the RPL-enabled network 206.

The computing system 600 may also include an input/output ("I/O") interface 608 that can receive input from input devices or provide output to output devices. The interface 608 may include RF antennas capable of transmitting and receiving RF communication from other nodes in the mesh network 101. The computing system 600 may also be able to communicate with one or more other computing devices or computer-readable data sources using the interface 608. Additionally, a bus 606 can also be included in the computing system 600. The bus 606 can communicatively couple one or more components of the computing system 600 and allow for communication between such components.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A communication link establishment method, comprising:
    establishing, by a routing protocol for low power and lossy networks (RPL) enabled device, a communication link with a non-RPL-enabled device;
    establishing, by the RPL-enabled device, a network connection with an RPL-enabled network, wherein the RPL-enabled device receives a network prefix of the RPL-enabled network; and
    providing, by the RPL-enabled device, a proxy communication link between the non-RPL-enabled device and the RPL-enabled network, wherein providing the proxy communication link comprises:
        executing a control protocol exchange between the RPL-enabled device and the non-RPL-enabled device, wherein the RPL-enabled device receives an interface identifier of the non-RPL-enabled device during the control protocol exchange;
        generating, by the RPL-enabled device, a globally unique address (GUA) associated with the non-RPL-enabled device, wherein the GUA comprises a concatenation of (i) the network prefix of the RPL-enabled network and (ii) the interface identifier of the non-RPL-enabled device; and
        transmitting, by the RPL-enabled device, a proxy destination advertisement object to the RPL-enabled network, wherein the proxy destination advertisement object comprises the GUA.

2. The method of claim 1, wherein providing the proxy communication link further comprises:
    receiving, at the RPL-enabled device, a proxy destination advertisement object acknowledgement from the RPL-enabled network.

3. The method of claim 1, wherein the communication link with the non-RPL-enabled device comprises a point-to-point protocol communication link.

4. The method of claim 1, wherein establishing the communication link with the non-RPL-enabled device comprises:
    transmitting, by the RPL-enabled device, a link control protocol packet to the non-RPL-enabled device;
    receiving, at the RPL-enabled device, an additional link control protocol packet from the non-RPL-enabled device; and
    establishing, by the RPL-enabled device, the communication link with the non-RPL-enabled device using the link control protocol packet and the additional link control protocol packet.

5. The method of claim 4, wherein establishing the communication link with the non-RPL-enabled device further comprises:
    performing, by the RPL-enabled device, an authentication process with the non-RPL-enabled device.

6. The method of claim 1, wherein establishing the network connection with the RPL-enabled network comprises:
    transmitting, by the RPL-enabled device, an enhanced beacon request to a root node of the RPL-enabled network;

receiving, at the RPL-enabled device, a destination oriented directed acyclic graph (DODAG) information object from the RPL-enabled network, wherein the DODAG information object comprises the network prefix of the RPL-enabled network;

transmitting, by the RPL-enabled device, a destination advertisement object to the RPL-enabled network; and receiving, at the RPL-enabled device, a destination advertisement object acknowledgement from the RPL-enabled network.

7. The method of claim 1, further comprising:

receiving, at the RPL-enabled device, a message from the RPL-enabled network for the non-RPL-enabled device; and routing the message to the non-RPL-enabled device using the GUA.

8. The method of claim 1, wherein the proxy destination advertisement object further comprises a flag indicating that the GUA originates from the non-RPL-enabled device.

9. The method of claim 1, wherein providing the proxy communication link between the non-RPL-enabled device and the RPL-enabled network comprises establishing an IPv6 communication link between the non-RPL-enabled device and the RPL-enabled network.

10. A node of a networked system, comprising:

a processor configured to execute computer-readable instructions;

a memory configured to store the computer-readable instructions that, when executed by the processor, cause the processor to perform operations comprising:

establishing a network connection between the node and a protocol-enabled network, wherein the node is protocol enabled and receives a network prefix of the protocol-enabled network;

establishing a communication link between the node and a non-protocol-enabled device; and providing a proxy communication link between the non-protocol-enabled device and the protocol-enabled network through the node, wherein providing the proxy communication link comprises:

executing a control protocol exchange between the node and the non-protocol-enabled device, wherein the node receives an interface identifier of the non-protocol-enabled device during the control protocol exchange;

generating, by the node, a globally unique address (GUA) associated with the non-protocol-enabled device, wherein the GUA comprises a concatenation of (i) the network prefix of the protocol-enabled network and (ii) the interface identifier of the non-protocol-enabled device; and transmitting, by the node, a proxy destination advertisement object to the protocol-enabled network, wherein the proxy destination advertisement object comprises the GUA.

11. The node of claim 10, wherein the node and the protocol-enabled network communicate using a border gateway protocol (BGP) or a 6LoWPAN Ad Hoc On-Demand Distance Vector Routing (LOAD) protocol.

12. The node of claim 10, wherein the node and the protocol-enabled network communicate using a routing protocol for low power and lossy networks (RPL).

13. The node of claim 10, wherein establishing the communication link between the node and the non-protocol-enabled device comprises:

transmitting a link control protocol packet to the non-protocol-enabled device;

receiving an additional link control protocol packet from the non-protocol-enabled device;

performing an extensible authentication protocol-transport layer security (EAP-TLS) mutual authentication process; and establishing an IPv6 communication link with the non-protocol-enabled device using the link control protocol packet and the additional link control protocol packet.

14. The node of claim 10, wherein providing the proxy communication link comprises:

receiving the GUA of the non-protocol-enabled device;

transmitting a proxy destination advertisement object to the protocol-enabled network, wherein the proxy destination advertisement object comprises the GUA; and receiving a proxy destination advertisement object acknowledgement from the protocol-enabled network.

15. The node of claim 14, wherein the proxy destination advertisement object further comprises a flag indicating that the GUA originates from the non-protocol-enabled device.

16. A non-transitory computer-readable medium having instructions stored thereon, the instructions executable by a processing device to perform operations comprising:

establishing a communication link between a routing protocol for low power and lossy networks (RPL) enabled device and a non-RPL-enabled device;

establishing a network connection between the RPL-enabled device and an RPL-enabled network, wherein the RPL-enabled device receives a network prefix of the RPL-enabled network; and providing a proxy communication link between the non-RPL-enabled device and the RPL-enabled network using the RPL-enabled device, wherein providing the proxy communication link comprises:

executing a control protocol exchange between the RPL-enabled device and the non-RPL-enabled device, wherein the RPL-enabled device receives an interface identifier of the non-RPL-enabled device during the control protocol exchange;

generating, by the RPL-enabled device, a globally unique address (GUA) associated with the non-RPL-enabled device, wherein the GUA comprises a concatenation of (i) the network prefix of the RPL-enabled network (ii) the interface identifier of the non-RPL-enabled device; and transmitting, by the RPL-enabled device, a proxy destination advertisement object to the RPL-enabled network, wherein the proxy destination advertisement object comprises the GUA.

17. The non-transitory computer-readable medium of claim 16, wherein the proxy destination advertisement object further comprises a flag indicating that the GUA originates from the non-RPL-enabled device.

18. The non-transitory computer-readable medium of claim 16, wherein establishing the communication link comprises:

transmitting a link control protocol packet to the non-RPL-enabled device;

receiving an additional link control protocol packet from the non-RPL-enabled device; and establishing the communication link with the non-RPL-enabled device using the link control protocol packet and the additional link control protocol packet.

19. The non-transitory computer-readable medium of claim 16, wherein establishing the network connection comprises:

transmitting an enhanced beacon request to the RPL-enabled network;

receiving a destination oriented directed acyclic graph (DODAG) information object from the RPL-enabled network, wherein the DODAG information object comprises the network prefix of the RPL-enabled network;

transmitting a destination advertisement object to the RPL-enabled network; and receiving a destination advertisement object acknowledgement from the RPL-enabled network.

20. The non-transitory computer-readable medium of claim 16, wherein providing the proxy communication link comprises:

transmitting a proxy destination advertisement object associated with the non-RPL-enabled device to the RPL-enabled network; and receiving a proxy destination advertisement object acknowledgement from the RPL-enabled network.

* * * * *